(No Model.) 2 Sheets—Sheet 1.
O. B. PECK.
MACHINERY FOR CENTRIFUGALLY TREATING PARTICLES OF METALLIC OR MINERAL BEARING SUBSTANCES OF DIFFERENT DEGREES OF SPECIFIC GRAVITY.
No. 444,616. Patented Jan. 13, 1891.
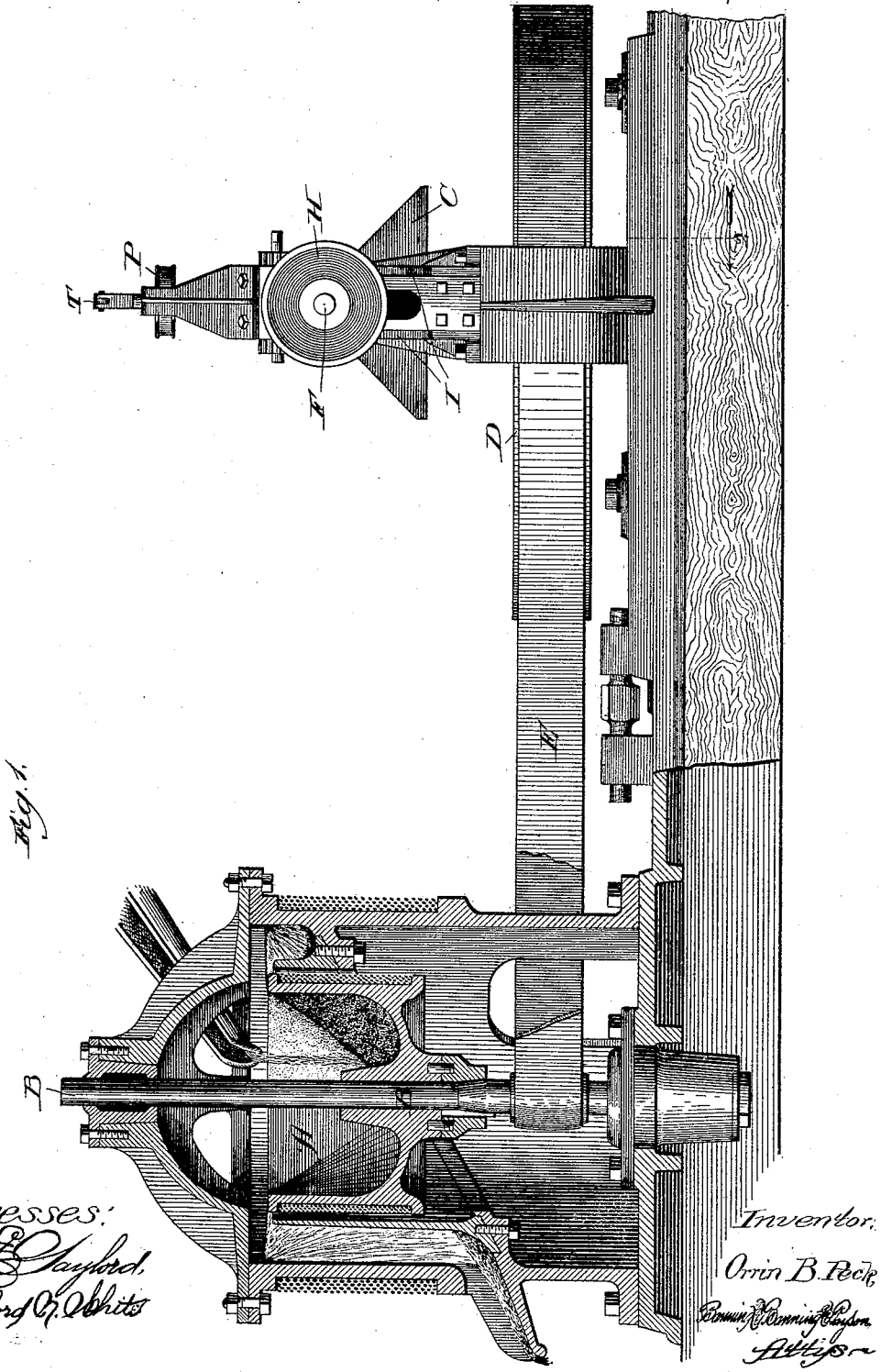

(No Model.) 2 Sheets—Sheet 2.
O. B. PECK.
MACHINERY FOR CENTRIFUGALLY TREATING PARTICLES OF METALLIC OR MINERAL BEARING SUBSTANCES OF DIFFERENT DEGREES OF SPECIFIC GRAVITY.
No. 444,616. Patented Jan. 13, 1891.
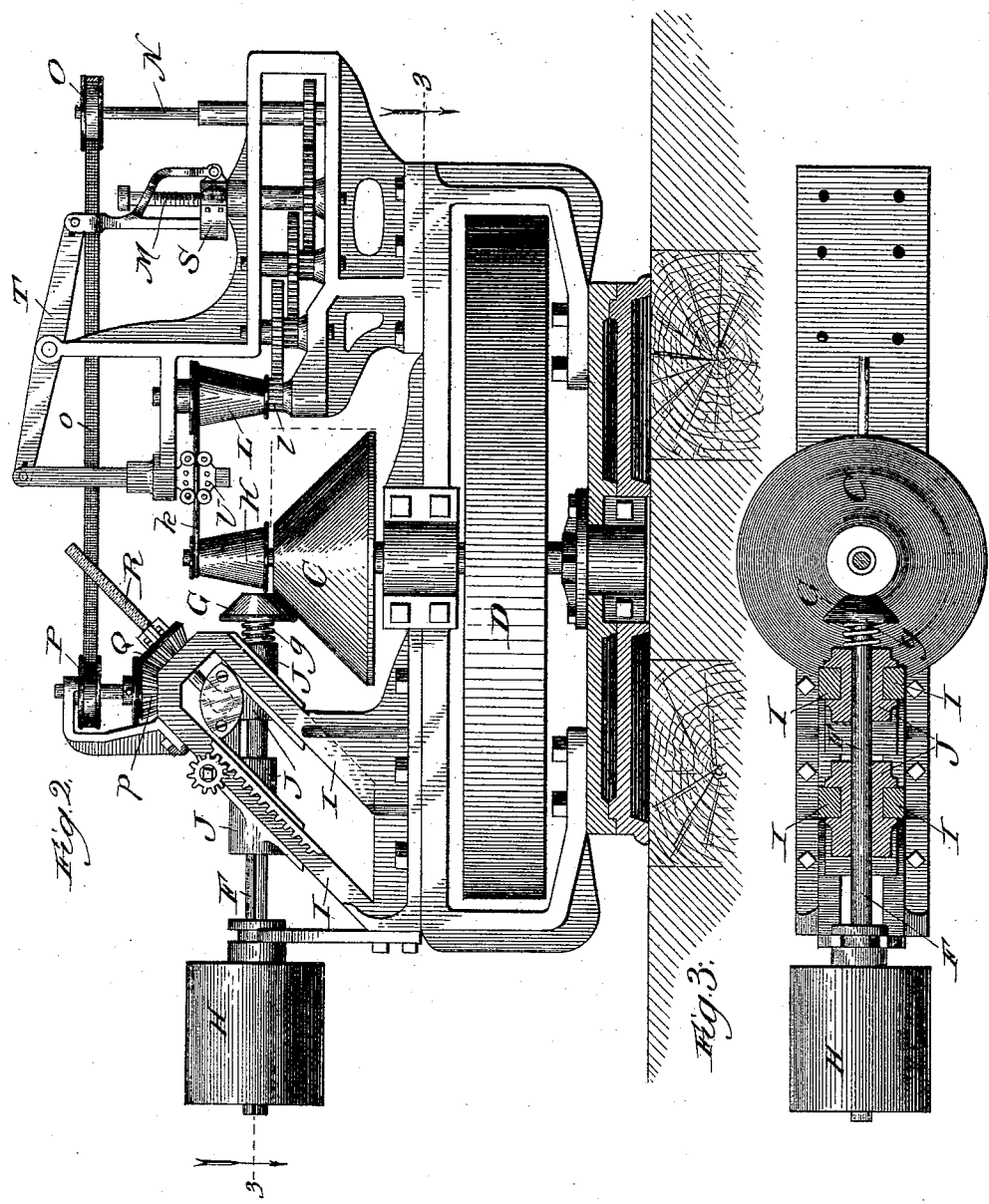

UNITED STATES PATENT OFFICE.

ORRIN B. PECK, OF CHICAGO, ILLINOIS, ASSIGNOR TO MELINDA PECK, OF SAME PLACE.

MACHINERY FOR CENTRIFUGALLY TREATING PARTICLES OF METALLIC OR MINERAL-BEARING SUBSTANCES OF DIFFERENT DEGREES OF SPECIFIC GRAVITY.

SPECIFICATION forming part of Letters Patent No. 444,616, dated January 13, 1891.

Application filed May 23, 1890. Serial No. 352,909. (No model.)

*To all whom it may concern:*

Be it known that I, ORRIN B. PECK, a citizen of the United States, residing at Chicago, Illinois, have invented certain new and useful Improvements in Machinery for Centrifugally Treating Particles of Metallic or Mineral-Bearing Substances of Different Degrees of Specific Gravity, of which the following is a specification.

The object of my invention is to devise means for gradually diminishing the speed of rotation of the revoluble vessel in which fine or powdery materials containing particles of different degrees of specific gravity are treated by the action of centrifugal force, and to provide means by which the rate of decreasing the speed of the vessel will gradually become increased as the operation is continued, so that the diminution of the centrifugal force developed will be more nearly uniform throughout the operation, as hereinafter explained; and my invention consists in the features and details of construction hereinafter described and claimed.

In the drawings, Figure 1 is a side elevation, partly in section, of my improved mechanism. Fig. 2 is an end elevation of a section taken through line 2 of Fig. 1, looking in the direction of the arrow; and Fig. 3 is a plan view taken in the line 3 of Fig. 2, looking in the direction of the arrows.

It will be understood that the centrifugal force that separates the particles of the matter being treated is developed by their being rapidly carried around in the vessel in the high speed of its rotation, and that the force so developed does not increase or decrease in intensity or strength in the same ratio as the speed of the revolution of the vessel, but that the force increases or decreases as or very nearly as the square of the speed of the vessel is increased or decreased. It will therefore be seen that by increasing or decreasing the speed of rotation of the vessel in a continuous or uniform degree or rate the centrifugal force developed will be increased or decreased in a very much greater or less degree and in a constantly and rapidly varying amount as compared with the change in the speed of the vessel. I have learned, consequently, that to secure a more uniform diminution of the centrifugal force developed or being developed throughout the operation it is necessary to constantly increase the rate at which the speed of rotation of the vessel is decreased. I have in the drawings illustrated one means by which this may be accomplished.

In making my improved machinery for gradually diminishing the speed of rotation of the revoluble vessel in which particles of metallic or mineral-bearing substances are treated and separated under the action of centrifugal force and for maintaining a more nearly uniform diminution or rate of decreasing the centrifugal force developed to separate the particles of material being treated, I employ a revoluble vessel A, mounted on a shaft B, by which it may be rotated. The shaft B is supported in proper and suitable journals to enable it to sustain the weight of the revoluble vessel and to be rotated at a high rate of speed.

In order to rotate the shaft B, and with it the revoluble vessel, I arrange in convenient and proper relation thereto another shaft provided with a beveled friction gear or wheel C, through which it is intended to be rotated. This shaft carries a pulley D, which is connected by the belt E to the pulley on the revoluble shaft B, carrying the vessel in which the substance is to be treated.

To rotate the shaft carrying the friction-gear C and the pulley D, I arrange another shaft F, preferably at right angles to it, provided with a beveled friction gear-wheel G, which bears against the beveled or inclined surface of the wheel C and rotates it by frictional contact therewith. The shaft F is provided with a pulley H, connected by means of belts or otherwise to a line or other shaft which is rotated by any convenient motive power, so as to impart the requisite speed of rotation to it. It is supported in suitable journal-bearings J, arranged in an inclined frame I, which serves as a guide as well as support for the journals. The inclination of the frame I is intended to be the same as the surface of the beveled wheel C, so that as the shaft F is moved up and down on such frame its friction-wheel G will always maintain the proper contact with its beveled surface, and to insure a sufficiently strong frictional contact between the wheels C and G, I have interposed a sufficiently strong spring $g$ between the end of the journal-box J and the wheel G, which constantly presses it in contact with the wheel C. The friction-wheel C is made longer or with a much wider surface than that of the wheel G, so that as the latter is carried up or down, through the movement of the journals J and the shaft F in the guides of frame I, a continuous and proper frictional contact is maintained. Owing to the fact that the wheel C continually grows larger in diameter from its top to its lower end it will require a greater number of revolutions of the wheel G to effect a given number of revolutions of the wheel C at its larger than at its smaller diameter. Hence it follows that as the shaft carrying the wheel G is intended to be rotated at a uniform rate of speed and is gradually moved along downward in the guides I, carrying the wheel G with it and causing the wheel to slowly come in frictional contact with the increasing or larger diameter of the wheel C, the wheel C will constantly and steadily be rotated at a decreasing rate of speed, and the vessel that through its connections is driven by it will also be rotated at a proportionately-decreasing rate of speed until the wheel G has reached the largest or lowest diameter of the wheel C, which is intended to be at the end of the operation, or when the vessel has become sufficiently filled to be emptied. If the wheel G is passed or carried downward or across the surface of the wheel C at a uniform rate of transverse movement, the revolutions of the latter, and consequently that of the vessel, will be decreased at a uniform rate, and, as above explained, the diminution of centrifugal force will be at a greatly-varying rate.

To secure a more uniform rate of diminution of the centrifugal force, I have arranged means by which the wheel G will be carried down across the surface of the wheel C at a constantly-increasing rate from its initial point to the end of the operation, thus producing a constantly-increasing rate of diminishing the rotation of the wheel C and the vessel, consequently maintaining a more nearly uniform rate of diminution of the centrifugal force being developed. To accomplish this, I have arranged, preferably immediately above the beveled frictional gear C and on the same shaft, a taper sheave or pulley K, connecting by a belt $k$ to another sheave or pulley L, mounted on a proper shaft suitably supported in boxes or journals to permit it to be rotated. The taper pulleys K and L are inclined in opposite directions, so that the belt $k$ will be at the largest portion of the one when at the smallest portion of the other. The shaft on which the pulley L is mounted is provided with a pinion $l$, connected with a train of gear-wheels, (shown in Fig. 2,) so as to rotate a threaded rod M and a shaft N. The shaft N bears a pulley O, connected by a belt $o$ with a pulley P, mounted upon a shaft bearing a beveled pinion $p$, which engages with a pinion Q, adapted to be rotated on a threaded rod R. This rod connects with the framework forming part of the journal J, supporting the shaft F, and as the pinion Q is rotated in one direction or the other the rod R, together with the journals J, and the shaft F and its connected parts are moved up or down. At the beginning of the operation the belt $k$ is intended to be at the top or smallest part of the taper pulley K and at the largest part of the taper pulley L. As the parts are rotated, the threaded rod M is caused to rotate and to move a nut S along the same. This nut is connected by a suitable pivoted link to a lever T, suitably fulcrumed, and which carries at its other end, by suitably-pivoted link connections, a belt-guide V, connected with the belt $k$. As the nut S is moved up on the threaded rod M it will raise the end of the lever T, to which it is connected, and cause the other end with the belt-guide to be moved down, carrying the belt $k$ with it. As the belt is moved down, so that it encircles the larger portion of the pulley K, such pulley will of course be rotated more slowly. At the same time the belt will move in the same way along the pulley L, constantly encircling a smaller portion and causing it to rotate at a higher rate of speed. As the pulley L increases in the speed of its rotation, it correspondingly increases the speed of the parts with which it is connected, and among others the shaft M, with its pulley O, and through the belt $o$ the pulley P and the pinions $p$ and Q. This will cause the shaft F and the beveled gear G to descend at a correspondingly-increasing rate of transverse movement from the top to the bottom of the beveled wheel C. In this way the speed of rotation of the revoluble vessel A will be correspondingly diminished or decreased at an increasing rate as the operation proceeds. As the speed of rotation of such vessel, and with it the centrifugal force developed by its rotation, is so decreased, the particles of fine or powdery material introduced into it and accumulating in the same will constantly and gradually assume a position more and more oblique to the vertical than when the vessel is rotated at a higher rate of speed. The heavier particles of material will therefore gradually lodge against the sides, forming a wall or mass constantly increasing in thickness in the vessel, as shown in Fig. 1, while the lighter particles of material, which are less forcibly acted upon by the action of centrifugal force, will move up the inclined surface of the accumulated material and pass out at the top. By rotating the vessel at a high rate of speed when the material begins to be introduced and gradually diminishing its speed until the end of the operation, which may occupy an hour or more, I am able to accumulate and save the heaviest and most valuable parts of the material treated, which would be thrown out and lost if I maintained the rotation of the revoluble vessel at a uniform speed from the beginning to the end. If, however, the diminution of the centrifugal force is at a nearly-uniform rate throughout the operation, the accumulation of particles in the vessel will be at a more uniform rate, and consequently the material collected and retained in the vessel will be of a more uniform character or consistency, containing less lighter and worthless particles, and during the operation fewer heavier and more valuable particles will be discharged and lost.

Of course it will be understood that the shaft F and beveled wheel G are to be returned or restored to their initial position at the commencement of each operation.

As the mechanical means for gradually increasing the rate at which the speed of the vessel is decreased throughout the operation may be varied, I do not wish to confine myself to the exact details of construction described and shown, but propose to avail myself of such changes and variations as may embody the principles described above, and hereinafter claimed.

What I regard as new, and desire to secure by Letters Patent, is—

1. In machinery for centrifugally treating and separating particles of metallic or mineral-bearing substances, the combination of a revoluble vessel, means for rotating such vessel, and means for gradually and automatically decreasing its speed of rotation from the commencement to the end of the operation in a constantly and gradually increasing degree or rate to decrease the centrifugal force developed gradually and as nearly uniformly as practicable, substantially as described.

2. In machinery for centrifugally treating and separating particles of metallic or mineral-bearing substances, the combination of a revoluble vessel and means for rotating such vessel, comprising, among other things, beveled friction gear-wheels, of which one is movable along the beveled surface of the other over its different diameters, while remaining in frictional contact therewith, substantially as described.

ORRIN B. PECK.

Witnesses:
GEORGE S. PAYSON,
THOS. A. BANNING.